United States Patent
Rakshit

(10) Patent No.: US 11,642,852 B2
(45) Date of Patent: May 9, 2023

(54) ROTATIONAL MATERIAL SCATTERING ADDITIVE MANUFACTURING DEVICE

(71) Applicant: INTERNATIONAL BUSINESS MACHINES CORPORATION, Armonk, NY (US)

(72) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 273 days.

(21) Appl. No.: 16/918,068

(22) Filed: Jul. 1, 2020

(65) Prior Publication Data

US 2022/0001623 A1 Jan. 6, 2022

(51) Int. Cl.

| | |
|---|---|
| *B29C 64/393* | (2017.01) |
| *B29C 64/209* | (2017.01) |
| *B29C 64/241* | (2017.01) |
| *B29C 64/245* | (2017.01) |
| *B29C 64/236* | (2017.01) |
| *B29C 64/255* | (2017.01) |
| *B29C 64/188* | (2017.01) |
| *B29C 64/232* | (2017.01) |

(Continued)

(52) U.S. Cl.
CPC .......... *B29C 64/393* (2017.08); *B29C 64/188* (2017.08); *B29C 64/209* (2017.08); *B29C 64/232* (2017.08); *B29C 64/236* (2017.08); *B29C 64/241* (2017.08); *B29C 64/245* (2017.08); *B29C 64/255* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS 8,376,064 B1 * 2/2013 Swegle ............... A23G 3/10
29/729
2016/0236414 A1 8/2016 Reese
(Continued)

FOREIGN PATENT DOCUMENTS

| CN | 107825716 A | 3/2018 |
| EP | 2433716 A1 | 3/2012 |

OTHER PUBLICATIONS

"Centripetal Force," http://hyperphysics.phy-astr.gsu.edu/hbase/corf.html, printed May 1, 2020, pp. 1-5.
(Continued)

*Primary Examiner* — S. Behrooz Ghorishi
(74) *Attorney, Agent, or Firm* — Tihon Poltavets

(57) ABSTRACT

An apparatus for a rotational material scattering additive manufacturing device, the apparatus includes a base with a first protruding pin for mounting a first drum, where the first drum includes a first set of nozzle actuators configured to control a release of particle material through a first set of nozzles positioned on an outer edge of the first drum. The apparatus also includes the first drum configured to rotate about a central axis of the first protruding pin, wherein a rotational motor assembly is configured to rotate the first protruding pin. The apparatus also includes a microcontroller configured to control the first set of nozzle actuators and the rotational motor assembly.

16 Claims, 5 Drawing Sheets

(51) Int. Cl.
    *B33Y 50/02*     (2015.01)
    *B33Y 10/00*     (2015.01)
    *B33Y 30/00*     (2015.01)

(56) References Cited

U.S. PATENT DOCUMENTS

2019/0099942 A1    4/2019  Thompson
2019/0184635 A1*  6/2019  Garrett ................... B23K 26/34

OTHER PUBLICATIONS

Ali, et al., "Multi-nozzle extrusion system for 3D printer and its control mechanism," International Journal of Advanced Manufacturing Technology, DOI 10.1007/s00170-015-8205-9, Aug. 27, 2015, pp. 1-13.

Yin et al., "Cold spray additive manufacturing and repair: Fundamentals and applications", Elsevier, Additive Manufacturing 21, (2018), pp. 628-650.

\* cited by examiner

ROTATIONAL MATERIAL SCATTERING ADDITIVE MANUFACTURING DEVICE

FIELD OF THE INVENTION

This disclosure relates generally to additive manufacturing, and in particular, to a rotational material scattering additive manufacturing device.

BACKGROUND OF THE INVENTION

Additive manufacturing is the process of constructing a three-dimensional object from a computer-aided design (CAD) model. Typical additive manufacturing devices create the three-dimensional object by joining or solidifying layers of material (e.g., composite, metal), where the three-dimensional object is created layer by layer. Construction of the three-dimensional object utilizing the additive manufacturing device can take hours to days to create, due to the time-consuming process of disposing layer on top of layer of material.

SUMMARY

One aspect of an embodiment of the present invention discloses an apparatus for a scattering additive manufacturing device, the apparatus comprising: a base with a first protruding pin for mounting a first drum, wherein the first drum includes a first set of nozzle actuators configured to control a release of particle material through a first set of nozzles positioned on an outer edge of the first drum; the first drum configured to rotate about a central axis of the first protruding pin, wherein a rotational motor assembly is configured to rotate the first protruding pin; and a microcontroller configured to control the first set of nozzle actuators and the rotational motor assembly.

Another aspect of an embodiment of the present invention discloses a method for utilizing the scattering additive manufacturing device, the method comprising: performing, by a microcontroller, a calibration for a rotational motor assembly, a directional motor assembly, and a plurality of nozzle actuators of the scattering additive manufacturing device; responsive to determining a repair sequence was initialized, analyzing, by the microcontroller, an area of an object requiring a repair, wherein the area includes a void; determining, by the microcontroller, a printing sequence to the repair the area of the object, wherein the printing sequence instructs the scattering additive manufacturing device to project particle material into the void; and instructing, by microcontroller, the scattering additive manufacturing device to repair the area of the object.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
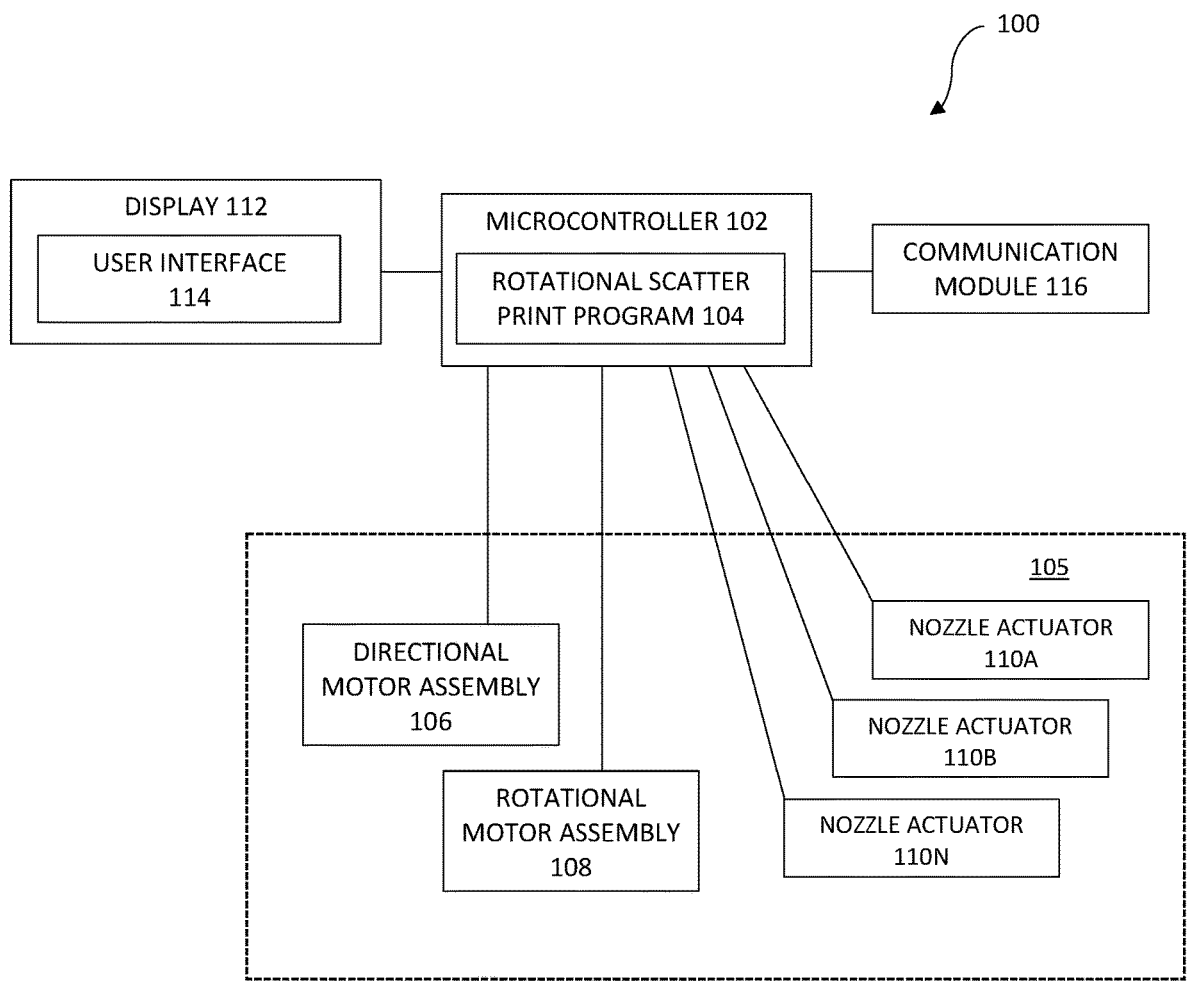
FIG. 1 depicts a control system for a rotational material scattering additive manufacturing device, in accordance with an embodiment of the present invention.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Many common fabrication techniques involve securing two objects using an adhesive layer between the objects. Oftentimes, the adhesive layer is chosen in an attempt to permanently secure the two objects together. And while this adhesive layer selection may be advantageous for typical usage of the overall product, there may be instances where separation of the joined objects is either desired, or necessary. In such instances, separation of the two objects, without physically damaging either of the objects, may be required so that one or both of the objects may be reused.

FIG. 1 depicts a control system for a rotational material scattering additive manufacturing device, in accordance with an embodiment of the present invention.

Control system 100 for a rotational material scattering additive manufacturing device, also referred to as a scattering additive manufacturing device, includes microcontroller 102 with rotational scatter program 104 for controlling the operational functions of the scattering additive manufacturing device. Microcontroller 102 is coupled to various components in subassembly 105, display 112, and communication module 116. Subassembly 105 of the scattering additive manufacturing device includes directional motor assembly 106, rotational motor assembly 108, and nozzle actuators 110A, 110B, and 110N. Directional motor assembly 106 allows for the movement of subassembly 105 relative to an object that is being repaired and/or printed. Directional motor assembly 106 can include one or more servo motors controlled by microcontroller 102 for moving subassembly 105 in an x-axis, y-axis, and/or z-axis direction relative to the object. Rotational motor assembly 108 allows for the movement of multiple drums with nozzle actuators 110A, 110B, and 110N for dispersing particle material. Rotational motor assembly 108 can utilize varying sized gears and multiple motors for controlling a rotational speed of each of the multiple drums with nozzle actuators 110A, 110B, and 110N.

Nozzle actuators 110A, 110B, and 110N each control the release of particle material while rotational motor assembly 108 rotates each of the multiple drums. It is to be noted, subassembly 105 can include, for example twenty nozzle actuators 110, where nozzle actuator 110N is the twentieth nozzle actuator 110. Display 112 with user interface 114 allows for a user to interact with rotational scatter print program 104 and communication module 116 allows for rotational scatter print program 104 to interact with an external device (e.g., client device, server computer), not illustrated in FIG. 1. Communication module 116 can be a device that communicates via protocols that include but are not limited to radio-frequency identification (RFID), near-field communication (NFC), Bluetooth®, and Wi-Fi™. Subassembly 105 can also include a camera and/or one or more surface reading devices for identifying defects in an object and for monitoring progress during the printing of an object.

Figure 2:
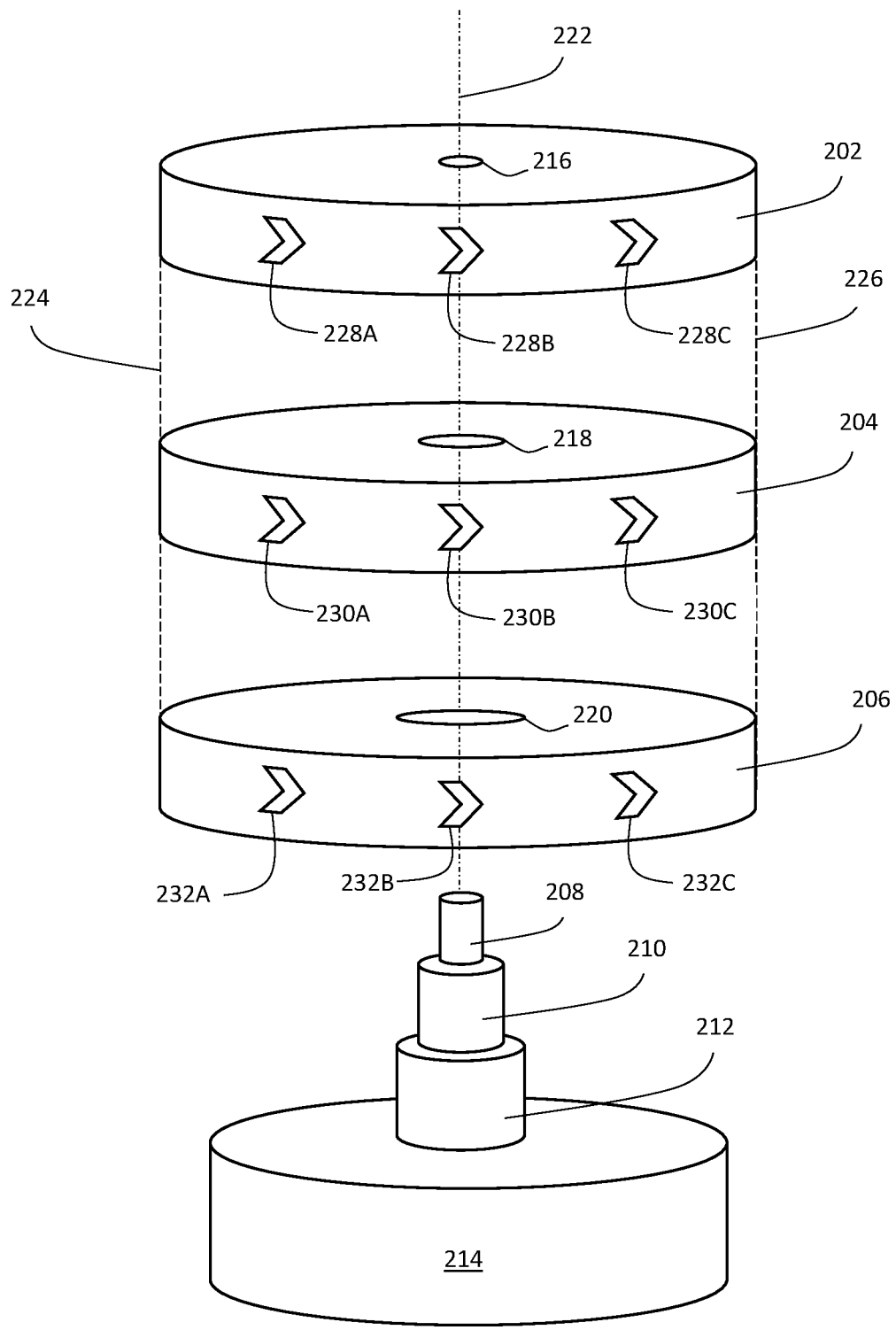
FIG. 2 depicts a 3-dimensional exploded view of a rotational material scattering additive manufacturing device, in accordance with an embodiment of the present invention.

FIG. 2 depicts a 3-dimensional exploded view of a rotational material scattering additive manufacturing device, in accordance with an embodiment of the present invention.

In this embodiment, a subassembly of scattering additive manufacturing device includes multiple stacked rotational drums 202, 204, and 206, wherein rotational drum 204 is disposed on top of rotational drum 204 and rotational drum 204 is disposed on top of rotational drum 206. A lower surface of rotational drum 202 is disposed on an upper surface of rotational drum 204, a lower surface of rotational drum 204 is disposed on an upper surface of rotational drum 206. The stacked rotational drums 202, 204, and 206 are disposed on pins 208, 210, and 212, respectively. Rotational drum 202 mounts to pin 208 of base 214, where pin 208 sits within aperture 216 of rotational drum 202. Rotational drum 204 mounts to pin 210 of base 214, where pin 210 sits within aperture 218 of rotational drum 204. Rotational drum 206 mounts to pin 212 of base 214, where pin 212 sits within aperture 220 of rotational drum 204. Base 214 is coupled to the directional motor assembly for moving the subassembly in the x-axis, y-axis, and/or z-axis direction relative to the object. In some embodiments, rotational drums 202, 204, and 206 are respectively coupled to pins 208, 210, and 212 utilizing a guide member and void combination for aligning and securing each rotation drum 202, 204, and 206 to respective pin 208, 210, and 212. The guide member can protrude out of an exterior surface of each pin 208, 210, and 212 in parallel to axis 222 and each guide member is placeable in a void on an inner surface of aperture 216, 218, and 220 of rotational drums 202, 204, and 204 in parallel to axis 222. Each guide member and void combination further allows for the alignment of each rotational drum 202, 204, and 206 on the respective pin 208, 210, and 212, when sliding rotational drum 206 onto pin 212, followed by rotational drum 204 onto pin 210, and followed by rotational drum 202 onto pin 208.

Each pin 208, 210, and 212 is coupled to a rotational motor assembly with one or more motors capable of rotating each pin 208, 210, and 212 independently from one another, thus allowing for each pin to rotate with a varying rotational speed. Furthermore, each pin 208, 210, and 212 has the ability to rotate in different directions (i.e., clockwise or counterclockwise), thus allowing for particle material to be released at a greater range of angles. In this embodiment, lines 224 and 224 illustrate the outer edges of rotational drums 202, 204, and 206, where each of rotational drums 202, 204, and 206 at least partially centered along axis 222 passing through pin 208, 210, 212 and apertures 216, 218, and 220. In other embodiments, rotational drums 202, 204, and 206 can each have different diameters, where the outer edges of rotational drums 202, 204, and 206 do not align. Each rotational drum 202, 204, and 206 is cylindrical in shape, where a smaller diameter defines an inner wall for mounting on respective pin 208, 210, and 212 and a larger diameter defines an outer wall. Each rotational drum 202, 204, and 206 includes an enclosed volume (e.g., chamber) for storing particle material utilized in the additive manufacturing process for repairing an object and/or printing an object. The enclosed volume of each rotational drum for storing the particle material is coupled to a plurality of nozzle actuators for releasing the particle material through a plurality of nozzles.

Nozzles 228A, 228B, and 228C are positioned along a circumference of rotational drum 202, where a respectively coupled nozzle actuator for each nozzle 228A, 228B, and 228C controls a release (i.e., open and close) of particle material as rotational drum 202 rotations about axis 222. As rotational drum 202 rotates about axis 222, each nozzle 228A, 228B, and 228C releases particle material tangentially to the outer wall of rotational drum 202 towards an objecting being repaired and/or printed. Nozzles 230A, 230B, and 230C are positioned along a circumference of rotational drum 204, where a respectively coupled nozzle actuator for each nozzle 230A, 230B, and 230C controls a release (i.e., open and close) of material as rotation drum 204 spins about axis 222. As rotational drum 204 rotates about axis 222, each nozzle 230A, 230B, and 230C releases particle material tangentially to the outer wall of rotational drum 204 towards an objecting being repaired and/or printed. Nozzles 232A, 232B, and 232C are positioned along a circumference of rotational drum 206, where a respectively coupled nozzle actuator for each nozzle 232A, 232B, and 232C controls a release (i.e., open and close) of material as rotation drum 206 spins about axis 222. As rotational drum 206 rotates about axis 222, each nozzle 232A, 232B, and 232C releases material tangentially to the outer wall of rotational drum 202 towards an objecting being repaired and/or printed. In this embodiment, as rotational drums 202, 204, and 206 rotate, the particle material in each enclosed volume is forced away from the center of each rotational drum 202, 204, and 206, where the nozzle actuator controls the release of the particle material. In other embodiments, each nozzle actuator can include an additional air supply to further accelerate the particle material towards the object being repaired and/or printed.

In some embodiments, nozzles 228, 230, and 232 on rotational drums 202, 204, and 206 include a heating device to heat the material prior to the material being released toward the object being repaired and/or printed. Alternative, the scattering additive manufacturing device can utilize an independent heating source (i.e., laser) directed to a portion of the object where the material is expected to land once released from nozzles 228, 230, and 232. The independent heat source can heat the area where the material is being directed to allow for the material to bond to the surface of the object being repaired and/or printed. Each rotational drum 202, 204, and 206 is removable from respective pin 208, 210, and 212, to allow for particle material to be filled into each rotational drum 202, 204, 206.

Figure 3:
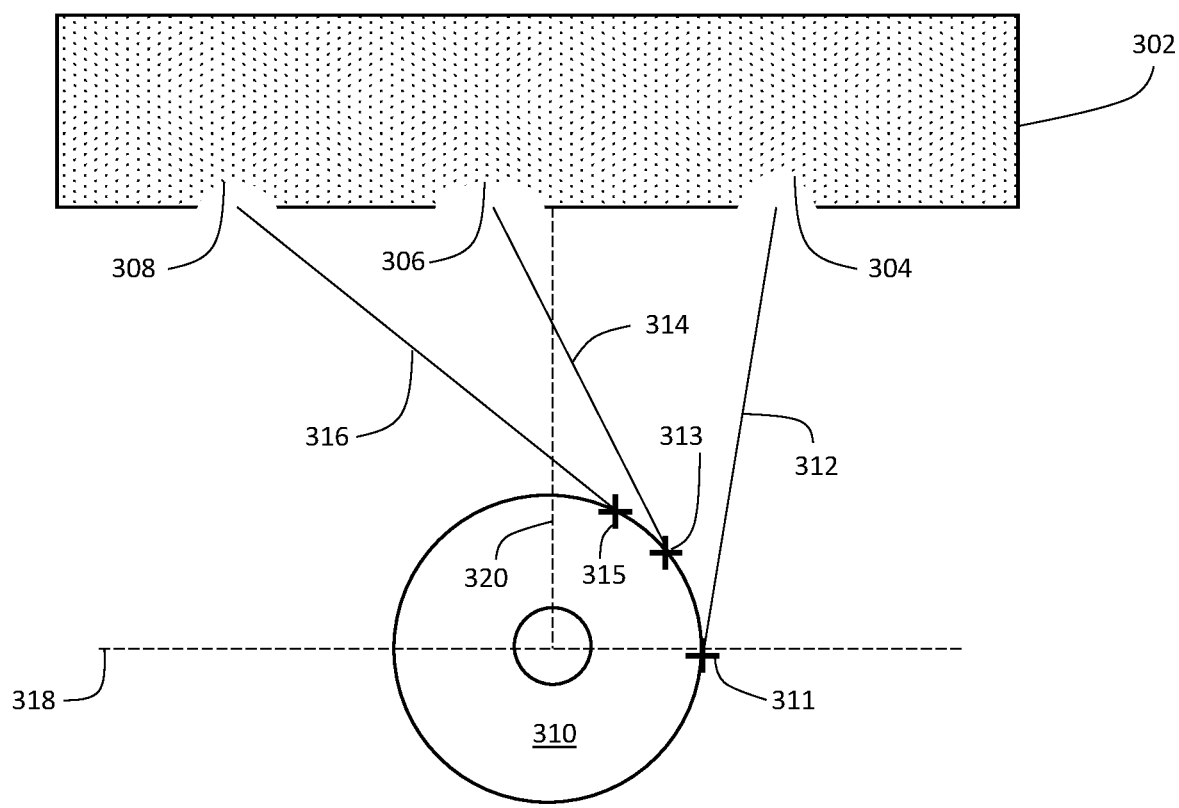
FIG. 3 depicts an overhead view of a rotational material scattering additive manufacturing device correcting manufacturing defects in an object, in accordance with an embodiment of the present invention.

FIG. 3 depicts an overhead view of a rotational material scattering additive manufacturing device correcting manufacturing defects in an object, in accordance with an embodiment of the present invention.

Object 302 includes multiple manufacturing defects with cavities 304, 306, and 308. As drum 310 of the scattering additive manufacturing device rotates in a counterclockwise direction, a first set of nozzle actuators open and close a first set of nozzles at various points of the rotation releasing material disposed within an enclosed volume of drum 310. In this embodiment, a single nozzle actuator opens three times creating multiple projectiles of particle material to fill cavities 304, 306, and 308. Release point 311 illustrates a location where a nozzle actuator releases particle material creating tangential projectile line 312 that travels towards cavity 304. Release point 313 illustrates a location where a nozzle actuator releases particle material creating tangential projectile line 314 that travels towards cavity 306. Release point 315 illustrates a location where a nozzle actuator releases particle material creating tangential projectile line 316 that travels towards cavity 308. To further assist with filling cavities 304, 306, and 308, drum 310 can move in the x-axis (318), y-axis (320), and z-axis (not illustrated in FIG. 3) direction utilizing a directional motor assembly to move drum 310 into a position (i.e., vicinity) to project particle material to fill a void of each cavity 304, 306, and 308. Furthermore, drum 310 of the scattering additive manufacturing device can rotate in a clockwise direction, where a second set of nozzle actuators will open and close a second set of actuators at various points of the rotation releasing material disposed within drum 310. As previously discussed, multiple drums (i.e., rotational drums) can be arranged in a stacked manner, where each rotational drum has multiple sets of nozzle actuators for releasing particle material depending on a rotational direction (i.e., clockwise or counterclockwise) of each of the multiple drums.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

Figure 4:
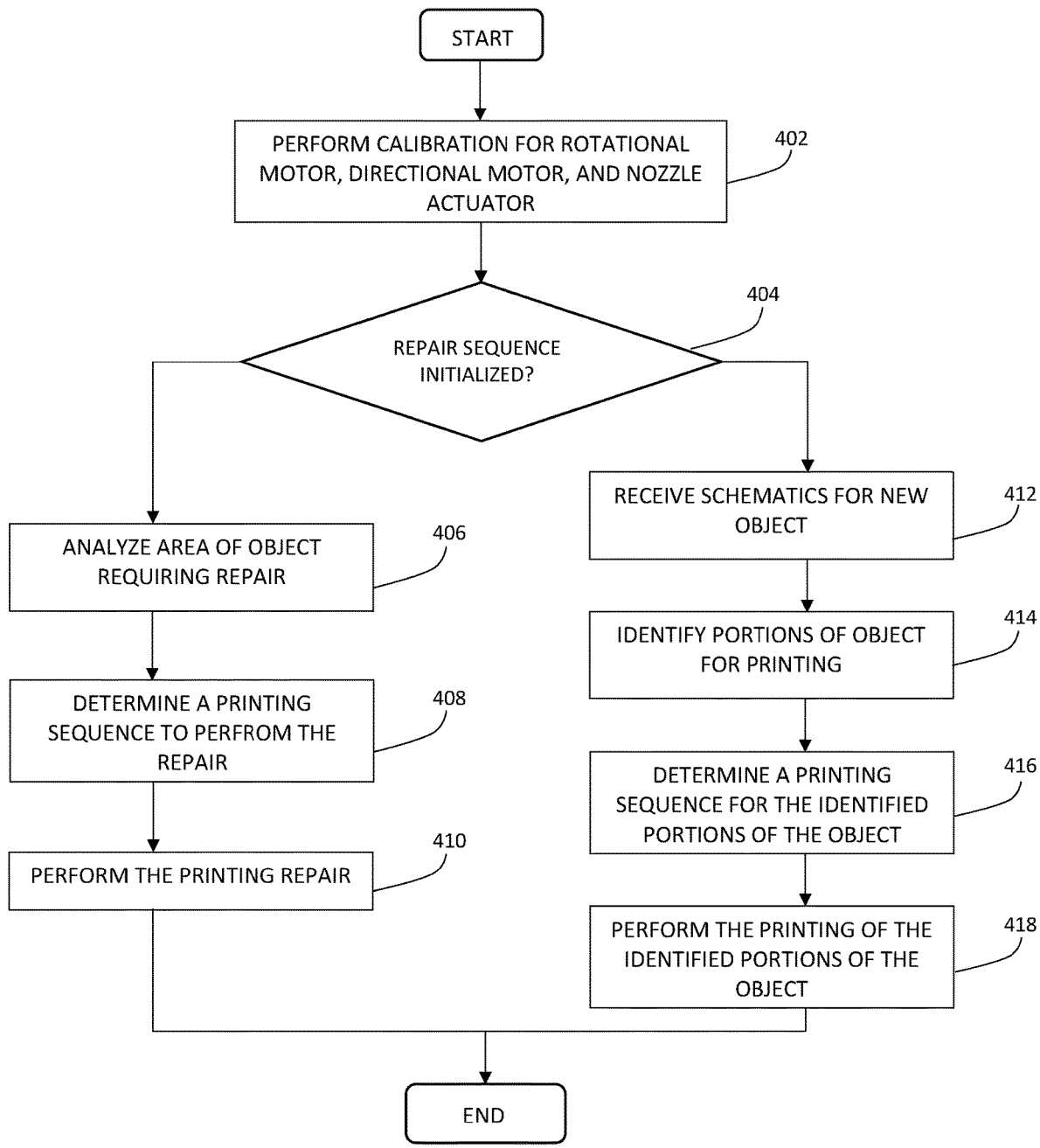
FIG. 4 is a flowchart depicting operational steps for utilizing a rotational material scattering additive manufacturing device, in accordance with one embodiment of the present invention.

FIG. 4 is a flowchart depicting operational steps for utilizing a rotational material scattering additive manufacturing device, in accordance with one embodiment of the present invention.

Rotational scatter print program 104 performs a calibration for the rotational motor, the directional motor, and the nozzle actuator (402). Rotational scatter print program 104 calibrates the rotational motor assembly to ensure each rotational drum can rotate freely and at an intended rotational speed. If the intended rotational speed of a rotational drum is different than an actual rotational speed of the rotational drum, a resulting tangential projectile line for the particle material can be skewed. As a result, the scattering additive manufacturing device may not be able to accurately repair a cavity (i.e., defect) on the object and/or print the object accurately. Rotational scatter print program 104 calibrates the directional motor assembly to ensure the scattering additive manufacturing device can move in the appropriate x-axis, y-axis, and/or z-axis direction relative to the object. Rotational scatter print program 104 calibrates each nozzle actuator associated with a single nozzle to ensure particle material is released when instructed. Alternatively, if the scattering additive manufacturing device utilizes electronically controlled valves for releasing particle material through the nozzles, rotational scatter print program 104 calibrates each electronically controlled valve to ensure particle material is released when instructed.

Subsequently, rotational scatter print program 104 determines whether a repair sequence has been initialized (decision 404). In the event, rotational scatter print program 104 determines a repair sequence has been initialized ('yes' branch, decision 404), rotational scatter print program 104 analyzes the area of the object requiring repair (406). In the event, rotational scatter print program 104 determines a repair sequence has not been initialized ('yes' branch, decision 404), rotational scatter print program 104 receives schematics for a new object (412).

For a repair sequence, rotational scatter print program 104 analyzes the area of the object requiring repair (406). The area of the object requiring a repair can be a cavity or void, such as a crack, that rotation scatter print program 104 is to correct utilizing particle material. Rotational scatter print program 104 can perform a 3D scan of the object to identify an area of the object requiring repair, identifying dimensions of the area of the object requiring repair, and determine a volume of particle material needed to repair the area. Rotational scatter print program 104 determines a printing sequence to perform the repair (408). The repair sequence is based on the identified dimensions of the area of the object requiring repair, available rotational movements of a rotational motor assembly of the scattering additive manufacturing device, and available directional movements (i.e., x-axis, y-axis, and z-axis) of a directional motor assembly of the scattering additive manufacturing device. Rotation scatter print program 104 can also take into account reliability of the repair in determining the repair sequence. For example, rotational scatter print program 104 can determine to create a print sequence where the particle material is projected onto a surface at a select degree variation (e.g., −45°<x<45°) from a perpendicular axis at a point on a surface of the area requiring repair. This ensures that projected material bonds properly with the surface of the cavity or void requiring repair.

Rotation scatter print program 104 performs the printing repair (410). Rotation scatter print program 104 utilizes the determined printing sequence to perform the repair and monitors a progress of the print as scattering additive manufacturing device performs the repair. Rotation scatter print program 104 can utilizes machine learning to monitor the progress of the repair and determine if the progress of the repair aligns with a desired outcome for the repair. If rotation scatter print program 104 determines the progress of the repair aligns with the desire outcome, rotation scatter print program 104 continues performing the printing repair based on the determined printing sequence. If rotation scatter print program 104 determines the progress of the repair does not align with the desire outcome, rotation scatter print program 104 can revert back to analyzing the area of object requiring repair and updating the printing sequence accordingly. In other embodiments, rotation scatter print program 104 has the ability to notify a user if a predetermined number (e.g., five) of updated printing sequences continues to provide a repair that does not align with the desire outcome.

For a new object, rotational scatter print program 104 receives schematics for a new object (412), identifies portions of the object for printing (414), and determines a printing sequence for the identified portions of the object (416). In one example, the new object being printed is cylindrical in shape, where the scattering additive manufacturing device is going to be utilized to print interior wall portions of the new object. Rotational scatter print program 104 has the ability to identify the portions of the object for printing by the scattering additive manufacturing device utilizing the received schematics (e.g., computer-aided design files, 3D model files). Responsive to rotational scatter print program 104 determining the scattering additive manufacturing device is placeable in an area where the portions of the object can be printed by the scattering additive manufacturing device, rotational scatter print program 104 determines the printing sequence for the identified portions of the object. The printing sequence is based on a placement location of the scattering additive manufacturing device (i.e., vicinity to the object), dimensions of the portions of the object being printed, available rotational movements of a rotational motor assembly of the scattering additive manufacturing device, and available directional movements (i.e., x-axis, y-axis, and z-axis) of a directional motor assembly of the scattering additive manufacturing device.

Similar to the repair sequence, rotation scatter print program 104 performs the printing of the identified portions of the objects (418). Rotation scatter print program 104 utilizes the determined printing sequence to perform the printing of the identified portions of the object and monitors a progress as the scattering additive manufacturing device performs the print. Rotation scatter print program 104 can utilizes machine learning to monitor the progress of the print and determine if the progress of the print aligns with a desired outcome for the portion of the object. If rotation scatter print program 104 determines the progress of the print aligns with the desired outcome, rotation scatter print program 104 continues performing the print based on the determined printing sequence for the identified portions of the object. If rotation scatter print program 104 determines the progress of the print does not align with the desired outcome, rotation scatter print program 104 can revert back to identifying the portions of object for printing and updating the printing sequence accordingly. In other embodiments, rotation scatter print program 104 has the ability to notify a user if a predetermined number (e.g., five) of updated printing sequences continues to provide a print that does not align with the desire outcome.

Embodiments of the present invention provide a scattering additive manufacturing device that includes a rotating cylindrical drum, where the drum can be mounted on a thrust bearing assembly. The drum can be split into multiple rings, where the multiple rings are arraigned in a stacked manner to form the drum. The multiple rings of the drum can operate as a single entity and/or independently, where each ring of the drum can rotate individually. The scattering additive manufacturing device also includes a chamber where particle material is stored for utilization during the printing process. A circumference of the scattering additive manufacturing device drum includes an array of nozzles, where each nozzle has an electronic valve control or actuator. Each nozzle can be individually controlled, where the electronic valve control or actuator opens and closes each nozzle for a determined amount of time as each drum rotates. A rotational speed can be controlled dynamically, based on the speed of rotation, where the material is thrown in a tangential direction from the location where the nozzle is opened.

Embodiments of the present invention provide a scattering additive manufacturing device with the multiple nozzles around the circumference projects particle material in different directions in a controlled manner, based on the position of the target areas to be repaired. The scattering additive manufacturing device projects the material in sequence so the target area (i.e., defect) is rectified. A rotational scatter print program analyzes the dimension of a defect (e.g., cavity, void) and accordingly determines a duration of time for opening the nozzles to project the particle material towards the target location, a nozzle selection, a releasing point in the rotation of a drum, and a duration of opening the nozzle is calculated based on the location and dimension of the defect being repaired. A rotational speed of the drum of the scattering additive manufacturing device is dependent on a distance from the target area being repaired and an initial speed of the particle material, the bonding strength of the particle material is dependent on the kinetic energy applied to the particle material which is protected.

In addition to repairing, the scattering additive manufacturing device can be utilized to print inner surfaces of a cylindrical object. The drum of the scattering additive manufacturing device can include multiple rows of nozzles around the circumference, where the rotation speed of each row can be controlled individually. Machine learning can be utilized to understand the position of the target objects, rotation speed, nozzle opening time, position, along with previously gather historical printing data gathered to correct printing parameters based on the various data points. The rotating drum of the scattering additive manufacturing device can rotate, clockwise, counterclockwise, helically, linearly or any combination of the above in a rotational pattern of the rotating drum depending on the target object is to be printed or repaired. Furthermore, the scattering additive manufacturing device can utilize multiple material while printing or correcting any object, in this case different nozzles can utilize different materials.

Figure 5:
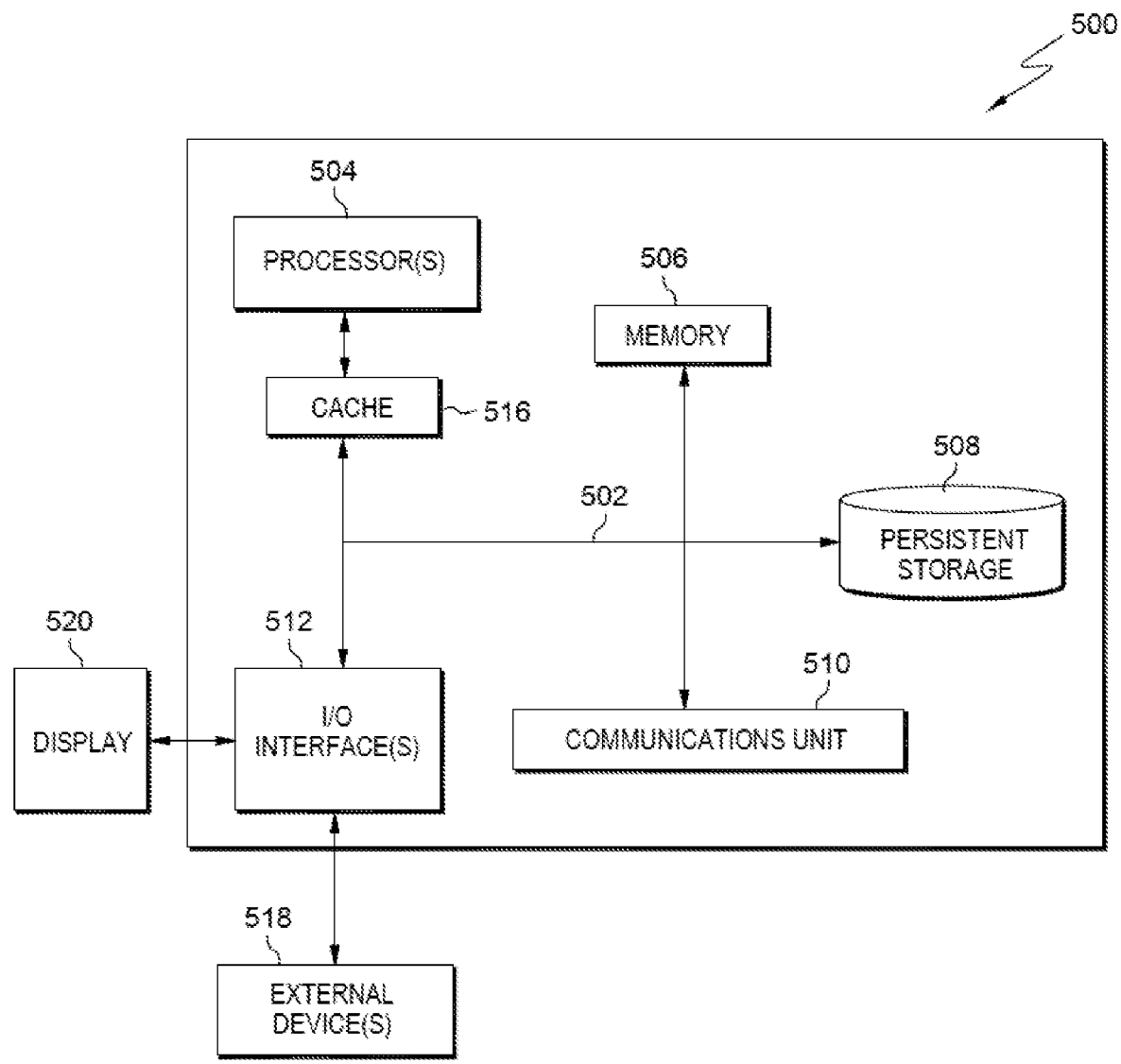
FIG. 5 depicts a block diagram of components of a computer system for performing the operational steps of a rotational scatter print program, in an embodiment, in accordance with the present invention.

FIG. 5 depicts a block diagram of components of a computer system for performing the operational steps of a rotational scatter print program, in an embodiment, in accordance with the present invention.

Computer system 500 represents an example of microcontroller 102 that includes the rotational scatter print program 104 operating on an additive manufacturing device. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for a rotational material scattering additive manufacturing device, the apparatus comprising:
    a base with a first protruding pin for mounting a first drum, wherein the first drum includes a first set of nozzle actuators configured to control a release of particle material through a first set of nozzles positioned on an outer edge of the first drum;
    a directional motor assembly mechanically coupled to the base, wherein the directional motor assembly is configured to move the base in an x-axis, y-axis, and z-axis direction;
    the first drum configured to rotate about a central axis of the first protruding pin, wherein a rotational motor assembly is configured to rotate the first protruding pin; and
    a microcontroller configured to control the first set of nozzle actuators and the rotational motor assembly.

2. The apparatus of claim 1, wherein the microcontroller is further configured to control the directional motor assembly.

3. The apparatus of claim 1, further comprising:
    the base with a second protruding pin for mounting a second drum, wherein the second drum includes a second set of nozzle actuators configured to control a release of the particle material through a second set of nozzles positioned on an outer edge of the second drum.

4. The apparatus of claim 3, further comprising:
    the second drum configured to rotate about a central axis of the second protruding pin, wherein the rotational motor assembly is configured to rotate the second protruding pin.

5. The apparatus of claim 4, wherein the microcontroller is configured to control the second set of nozzle actuators.

6. The apparatus of claim 5, wherein the central axis of the first protruding pin at least partially aligns with the central axis of the second protruding pin.

7. The apparatus of claim 6, wherein the first protruding pin is positioned on the second protruding pin and the second protruding pin is positioned on a top surface of the base.

8. The apparatus of claim 7, wherein the first drum is configured to rotate independently from the second drum.

9. The apparatus of claim 8, wherein a lower surface of the first drum is disposed on an upper surface of the second drum.

10. The apparatus of claim 4, further comprising:
    a first enclosed volume of the first drum configured for a first type of the particle material storage; and
    a second enclosed volume of the second drum configured for a second type of the particle material storage.

11. The apparatus of claim 4, further comprising:
    a first motor of the rotational motor assembly configured to rotate the first drum and a second motor of the rotational motor assembly configured to rotate the second drum.

12. The apparatus of claim 4, further comprising:
    a first motor of the rotational motor assembly configured to rotate the first drum in a first direction; and a second motor of the rotational motor assembly configured to rotate the second drum in a second direction opposite the first direction.

13. The apparatus of claim 4, further comprising:
the first drum includes a second set of nozzle actuators configured to control a release of the particle material through a second set of nozzles positioned on the outer edge of the first drum, wherein the first set of nozzle actuators of the first drum are configured to release the particle material in a first rotational direction and the second set of nozzle actuators of the first drum are configured to release the particle material in a second rotational direction.

14. The apparatus of claim 13, wherein the first rotational direction of the first drum is opposite the second rotational direction of the first drum.

15. The apparatus of claim 13, further comprising:
the second drum includes a second set of nozzle actuators configured to control a release of the particle material through a second set of nozzles positioned on the outer edge of the second drum, wherein the first set of nozzle actuators of the second drum are configured to release the particle material in a first rotational direction of the second drum and the second set of nozzle actuators of the second drum are configured to release the particle material in a second rotational direction of the second drum.

16. The apparatus of claim 15, wherein the first rotational direction of the second drum is opposite the second rotational direction of the second drum.

\* \* \* \* \*